US009529756B2

(12) United States Patent
Li et al.

(10) Patent No.: US 9,529,756 B2
(45) Date of Patent: Dec. 27, 2016

(54) METHOD AND TERMINAL FOR STARTING UNIVERSAL SERIAL USB STATE MACHINE

(75) Inventors: Qirui Li, Shenzhen (CN); Chao Li, Shenzhen (CN); Yaheng Wang, Shenzhen (CN); Tao Wang, Shenzhen (CN); Xianzheng Zeng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 494 days.

(21) Appl. No.: 13/990,094

(22) PCT Filed: Mar. 24, 2011

(86) PCT No.: PCT/CN2011/072121
§ 371 (c)(1),
(2), (4) Date: Jul. 3, 2013

(87) PCT Pub. No.: WO2012/071837
PCT Pub. Date: Jun. 7, 2012

(65) Prior Publication Data
US 2013/0275644 A1  Oct. 17, 2013

(30) Foreign Application Priority Data
Nov. 30, 2010  (CN) .......................... 2010 1 0565920

(51) Int. Cl.
G06F 13/40  (2006.01)
G06F 13/42  (2006.01)

(52) U.S. Cl.
CPC ........... *G06F 13/40* (2013.01); *G06F 13/4068* (2013.01); *G06F 13/426* (2013.01)

(58) Field of Classification Search
None
See application file for complete search history.

(56) References Cited

U.S. PATENT DOCUMENTS

| 2009/0045779 | A1* | 2/2009 | Sherman et al. | 320/136 |
| 2010/0090644 | A1* | 4/2010 | Nokkonen et al. | 320/107 |
| 2010/0164440 | A1* | 7/2010 | Ikeda | H02J 7/0054 |
| | | | | 320/162 |

FOREIGN PATENT DOCUMENTS

| CN | 101383627 A | 3/2009 |
| CN | 101702146 A | 5/2010 |

(Continued)

OTHER PUBLICATIONS

International Search Report for PCT/CN2011/072121 dated May 31, 2011.

*Primary Examiner* — Idriss N Alrobaye
*Assistant Examiner* — Dayton Lewis-Taylor
(74) *Attorney, Agent, or Firm* — Ling Wu; Stephen Yang; Ling and Yang Intellectual Property

(57) ABSTRACT

A method and terminal for starting a USB state machine are provided in the present document. The method includes: connecting a USB voltage bus pin to a logic level; if detecting that a voltage of a charging voltage pin is greater than a threshold limit value, starting a charging state machine and the USB state machine. In the present document, the USB state machine is started through a signal for detecting plug-in and pull-out of a charger, which can not only trigger the start-up of the USB state machine, but also possess a function of satisfying overvoltage protection, thereby the charger and the USB are enabled to share one physical interface with the simplest and securest method under the premise of guaranteeing the reliability.

4 Claims, 2 Drawing Sheets

(56) References Cited

FOREIGN PATENT DOCUMENTS

| | | | |
|---|---|---|---|
| CN | 101867647 | A | 10/2010 |
| JP | 2001202163 | A | 7/2001 |
| JP | 2007312476 | A | 11/2007 |
| WO | 2007034803 | A1 | 3/2007 |

* cited by examiner

METHOD AND TERMINAL FOR STARTING UNIVERSAL SERIAL USB STATE MACHINE

TECHNICAL FIELD

The present document relates to the field of Universal Serial Bus (USB) communication, and specifically, to a method and terminal for starting a USB state machine.

BACKGROUND OF THE RELATED ART

A start condition of a charging state machine of a hand-held terminal is to detect whether a Charging Voltage (VCHG) is greater than a certain threshold limit value (e.g., 3.3V), when an external voltage is greater than the value, it is to begin to start the charging state machine and begin a charging management, otherwise the charging is stopped.

A start condition of a USB state machine of a hand-held terminal is to detect whether a voltage of a USB Voltage Bus (USB_VBUS) end is greater than a Session value (e.g., 2.0V) in the USB specification, when an external voltage is greater than the value, it is to begin to start a USB enumeration process, otherwise the USB state machine is stopped.

The China's Ministry of Information Industry (MII) issued *Technical Requirements and Test Method of Charger and Interface for Mobile Telecommunication Terminal Equipment* (YD/T1591-2009) in November, 2006, it is formulated that a USB communication cable and a USB charging cable are an identical cable in a handset, that is, the cable can serve as a charging cable and also can serve as a USB communication cable, thus the VCHG and the USB_VBUS of a charging interface of mobile phone are shorted together. Currently, in the industry, a common practice of a USB start scheme that a charger and USB communication share one interface is described below.

A. The VCHG and the USB_VBUS are shorted together.

The circuit of this method is comparatively simple, but there exists the following disadvantage, a withstand voltage of the USB_VBUS end of hand-held terminal chip is lower, which cannot satisfy overvoltage protection requirements formulated in the *Technical Requirements and Test Method of Charger and Interface for Mobile Telecommunication Terminal Equipment*.

B. The VCHG is used to control the USB_VBUS power-on through a hardware circuit.

This scheme can implement the charging overvoltage protection, but there exists an external circuit, which increases costs.

SUMMARY OF THE INVENTION

The technical problem required to be solved by the present document is to provide a method and terminal for starting a USB state machine, to trigger the start-up of the USB state machine through a signal for detecting plug-in and pull-out of a charger and possess a function of satisfying overvoltage protection.

In order to solve the above technical problem, the present document provides a method for starting a Universal Serial Bus (USB) state machine, which comprises:

connecting a USB voltage bus pin to a logic level;

if detecting that a voltage of a charging voltage pin is greater than a threshold limit value, starting a charging state machine and the USB state machine.

Preferably, the above method can further be characterized in that: the logic level is a high level and the high level is not greater than a withstand voltage value of the USB voltage bus pin, the method further comprises: before monitoring the voltage of the charging voltage pin, shielding a USB session interruption.

Preferably, the above method can further be characterized in that: the step of connecting a USB voltage bus pin to a logic level comprises: grounding the USB voltage bus pin.

Preferably, the above method can further be characterized in that: after the step of starting a charging state machine and the USB state machine, the method further comprises: if detecting that the voltage of the charging voltage pin is less than or equal to the threshold limit value, quitting the USB state machine.

Preferably, the above method can further be characterized in that: the threshold limit value is 3.3V.

In order to solve the above problem, the present document further provides a terminal, which comprises a Universal Serial Bus (USB) interface, the terminal comprises a logic level module and a management module, wherein a USB voltage bus pin is connected to the logic level module, wherein, the logic level module is configured to: output a logic level;

the management module is configured to: if detecting that voltage of a charging voltage pin is greater than a threshold limit value, trigger a charging state machine and a USB state machine.

Preferably, the above terminal can further be characterized in that: the terminal further comprises a shielding module, wherein, the management module is further configured to: if detecting that the logic level output by the logic level module is a high level and the high level is not greater than a withstand voltage value of the USB voltage bus pin, trigger the shielding module;

the shielding module is configured to: shield a USB session interruption.

Preferably, the above terminal can further be characterized in that: the logic level module is a grounding module.

Preferably, the above terminal can further be characterized in that: the management module is further configured to: after starting the charging state machine and the USB state machine, if detecting that the voltage of the charging voltage pin is less than or equal to the threshold limit value, quit the USB state machine.

Preferably, the above terminal can further be characterized in that: the threshold limit value is 3.3V.

In conclusion, a method and terminal for starting a USB state machine are provided in the present document, the USB state machine is started through a signal for detecting plug-in and pull-out of a charger, which can not only trigger the start-up of the USB state machine, but also possess a function of satisfying overvoltage protection, thereby the charger and the USB are enabled to share one physical interface with the simplest and securest method under the premise of guaranteeing the reliability.

PREFERRED EMBODIMENTS OF THE INVENTION

Figure 1:
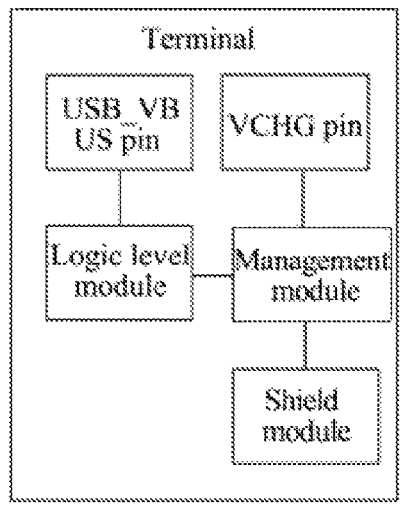
FIG. 1 is a schematic diagram of a terminal according to the example of the present document.

The scheme of the present document is mainly to fix a USB_VBUS pin to a certain kind of logic level, and then through a threshold limit value of a voltage of a VCHG pin, to trigger a charging state machine and a USB state machine simultaneously. Compared with other like products, this method has the following advantages: no additional components are required and costs of hand-held terminal are not increased.

The main characteristic of the present document is to fix the USB_VBUS pin to a certain kind of logic level, the logic level is unrelated to the VCHG, the hand-held terminal software is utilized to start the USB state machine according to a level of the VCHG, and a principle of the VCHG starting the USB state machine is described as follows.

(1) The present document relates to two pins within an internal circuit of the hand-held terminal device.

One pin is a Charging Voltage (VCHG) pin, a role of the VCHG pin is to detect a plug-in state and a pull-out state of charger, when a voltage value of a VCHG end is greater than a certain threshold limit value (e.g., 3.3V), it is judged that the charger is plugged in, and when the voltage value of the VCHG end is less than or equal to a certain threshold limit value (e.g., 3.3V), it is judged that the charger is pulled out.

The other pin is a USB_VBUS pin which provides the power supply for a USB, when a voltage value of the USB_VBUS end is greater than a Session value (e.g., 2.0V) in the USB specification, it is judged that a USB communication cable is plugged in to start the USB state machine, and when a voltage value of the USB_VBUS end is less than or equal to a Session value (e.g., 2.0V) in the USB specification, it is judged that the USB communication cable is pulled out.

(2) An operating voltage range of the VCHG is comparatively high, which is normally from 10 volts to 20 volts (e.g., 18V); and an operating voltage range of the USB_VBUS end is comparatively low (e.g., 5.5V).

(3) It is required that a charging cable and the USB communication cable share an interface according to the *Technical Requirements and Test Method of Charger and Interface for Mobile Telecommunication Terminal Equipment*, and it is also required that the charging satisfies an overvoltage protection function, a overvoltage value is about 8V-10V, that is, when an output of the charger is 8V-10V, the hand-held terminal will not be damaged.

A specific implementation principle of the present document is described as follows.

In hardware, the USB_VBUS pin is fixed to a certain logic level, and the logic level is not greater than a withstand voltage value of the USB voltage bus pin, thus the USB_VBUS pin can be protected.

Since the withstand voltage of USB_VBUS is lower than a threshold limit value of overvoltage protection of the charging, when it is charged in overvoltage, the hand-held terminal may be damaged, thus the USB_VBUS pin and the VCHG pin are separated, the USB_VBUS pin is fixed to a certain kind of logic level such as a low logic level (e.g., short to the ground), or a voltage value of a high logic level (not greater than the withstand voltage value of USB_VBUS) is supplied.

In software, the USB state machine is started by detecting the voltage value of VCHG.

When the voltage value of VCHG end is greater than 3.3V, the part of Power Management (PM) in a terminal circuit judges that the charger is plugged in, an interruption request is generated at the meantime, it is to notify the part of base band control in the terminal of that the charger has been plugged in, it prepares to execute a flow of controlling the USB state machine, and the USB state machine is started in a flow of the charging state machine in the present document.

In order to better understand the present document, the present document will be further described in combination with the accompanying drawings and specific examples below.

FIG. 1 is a schematic diagram of a terminal according to the example of the present document, and as shown in FIG. 1, the terminal of the example has a USB interface, and the terminal mainly includes a logic level module and a management module, wherein a USB_VBUS pin is connected to the logic level module, wherein, the logic level module is configured to: output a logic level;

the management module is configured to: if detecting that a voltage of a charging voltage pin is greater than a threshold limit value, trigger a charging state machine and a USB state machine.

The terminal of the example also can include a shielding module, when the logic level output by the logic level module is a high level, the management module will trigger the shielding module, and the shielding module shields a USB session interruption.

The logic level module can be a grounding module, for example, the USB_VBUS is directly grounded.

Preferably, after starting the charging state machine and the USB state machine, the management module is further configured to: if detecting that the voltage of the charging voltage pin is less than or equal to the threshold limit value, quit the USB state machine.

Figure 2:
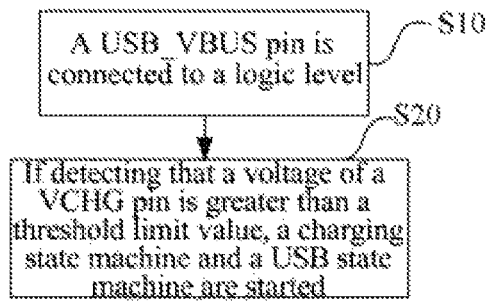
FIG. 2 is a flow diagram of a method for a terminal starting a USB state machine according to the present document.

FIG. 2 is a flow diagram of a method for a terminal starting a USB state machine according to the present document, and as shown in FIG. 2, the following steps are included.

In step S10, a USB_VBUS pin is connected to a logic level.

In step S20, if detecting that a voltage of a VCHG pin is greater than a threshold limit value, a charging state machine and a USB state machine are started.

The method for starting the USB state machine according to the present document will be described through two examples below.

Example 1

In hardware, a USB_VBUS pin is connected to a low logic level.

Figure 3:
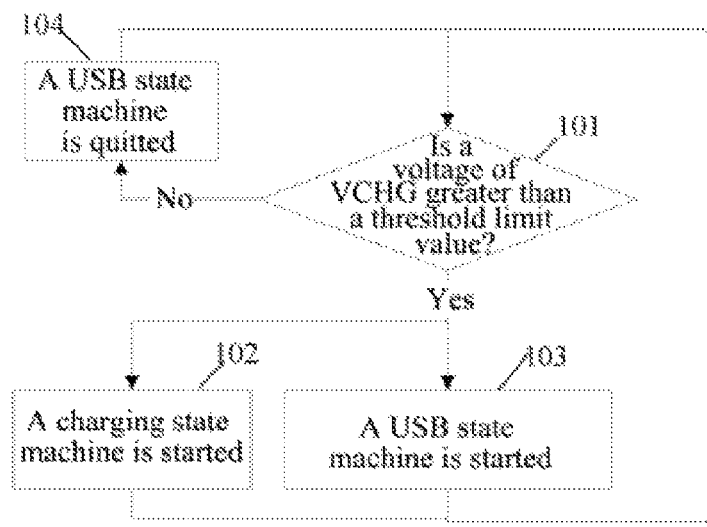
FIG. 3 is a flow diagram of a method for starting a USB state machine according to the example 1 of the present document.
Figure 4:
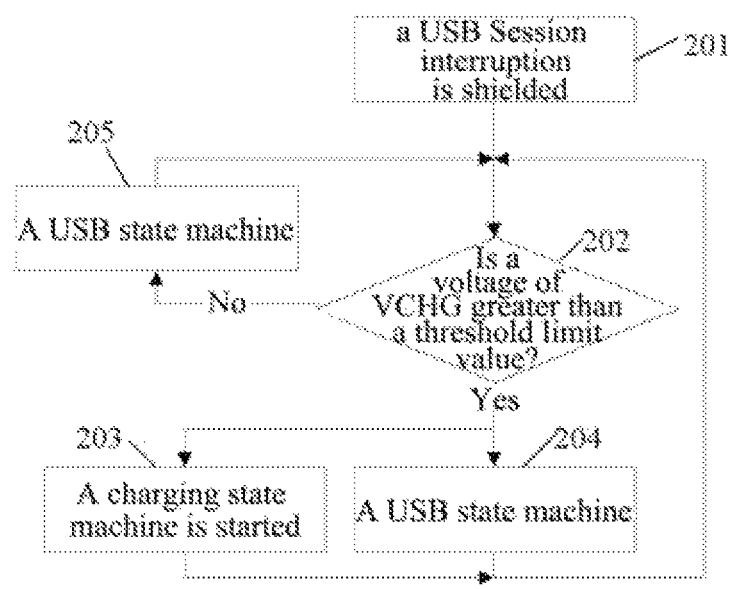
FIG. 4 is a flow diagram of a method for starting a USB state machine according to the example 2 of the present document.

In software, the implementation steps are shown in FIG. 3 as follows.

In step 101, it is to detect whether a voltage value of a VCHG end is greater than a threshold limit value, if yes, i.e., it is detected that a charger is plugged in, step 102 and step 103 are executed, and if not, no processing is executed.

In step 102, a charging state machine is started, and a battery is charged.

In step 103, a USB state machine is started, and a USB enumeration process is performed.

A sequence for executing step 102 and step 103 is not limited.

In step 104, after the USB state machine is started, if detecting that the voltage value of the VCHG end is less than or equal to the threshold limit value, the software quits the USB state machine.

Example 2

In hardware, a USB_VBUS pin is connected to a high logic level.

In software, the implementation steps are shown in FIG. 3 as follows.

In step 201, when it is detected that a level of the USB_VBUS pin is the high logic level, during an initialization, a USB Session interruption is shielded, which makes the USB_VBUS pin fail to start a USB state machine.

In step 202, it is to detect whether a voltage value of a VCHG end is greater than a threshold limit value, if yes, i.e., it is detected that a charger is plugged in, step 203 and step 204 are executed, and if not, no processing is executed.

In step 203, a charging state machine is started, and a battery is charged.

In step 204, a USB state machine is started, and a USB enumeration process is performed.

A sequence of executing step 203 and step 204 is not limited.

In step 205, after the USB state machine is started, if detecting that the voltage value of VCHG end is less than or equal to the threshold limit value, the software quits the USB state machine.

The method for the hand-held terminal starting the USB state machine through a signal namely the Charging Voltage (VCHG) for detecting plug-in and pull-out of the charger is applied to any terminal products in which the charger and USB communication share one physical interface function.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document, Certainly, the present document can still have other various examples, the skilled familiar to the art can make various corresponding changes and transformations according to the present document without departing from the spirit and essence of the present document, and these corresponding changes and transformations shall all fall into the protection scope of the appended claims of the present document.

INDUSTRIAL APPLICABILITY

A method and terminal for starting a USB state machine are provided in the present document, the USB state machine is started through a signal for detecting plug-in and pull-out of a charger, which can not only trigger the start-up of the USB state machine, but also possess a function of satisfying overvoltage protection, thereby the charger and the USB are enabled to share one physical interface with the simplest and securest method under the premise of guaranteeing the reliability.

What is claimed is:

1. A method for starting a Universal Serial Bus (USB) state machine, comprising:
   fixing a USB voltage bus pin to a certain logic level;
   when detecting that a voltage of a charging voltage pin is greater than a threshold limit value, starting both a charging state machine and a USB state machine;
   wherein, after the step of starting both the charging state machine and the USB state machine, the method further comprises:
   when detecting that the voltage of the charging voltage pin is less than or equal to said threshold limit value, quitting both the charging state machine and the USB state machine;
   thereby both the charging state machine and the USB state machine are started and quit through the voltage of the charging voltage pin for detecting plug-in and pull-out of a charger;
   wherein, the logic level is a high level and the high level is not greater than a withstand voltage value of the USB voltage bus pin, and the method further comprises: before monitoring the voltage of the charging voltage pin, shielding a USB session interruption; or
   wherein, the step of fixing the USB voltage bus pin to a logic level comprises: grounding the USB voltage bus pin, and the logic level of the USB voltage bus pin is fixed and will never be changed.

2. The method according to claim 1, wherein, the threshold limit value is 3.3V.

3. A terminal, comprising a Universal Serial Bus (USB) interface, said terminal comprising a logic level module and a management module, wherein a USB voltage bus pin is connected to the logic level module, wherein,
   the logic level module is configured to: output a logic level; thereby the USB voltage bus pin is fixed to a certain logic level;
   the management module is configured to: when detecting that a voltage of a charging voltage pin is greater than a threshold limit value, trigger both a charging state machine and a USB state machine;
   wherein the management module is further configured to: after starting both the charging state machine and the USB state machine, when detecting that the voltage of the charging voltage pin is less than or equal to said threshold limit value, quit both the charging state machine and the USB state machine;
   thereby both the charging state machine and the USB state machine are started and quit through the voltage of the charging voltage pin for detecting plug-in and pull-out of a charger;
   wherein the terminal further comprises a shielding module; the management module is further configured to: when detecting that the logic level output by the logic level module is a high level and the high level is not greater than a withstand voltage value of the USB voltage bus pin, trigger the shielding module; and the shielding module is configured to: shield a USB session interruption; or
   wherein the logic level module is a grounding module, and the logic level of the USB voltage bus pin is fixed and will never be changed.

4. The terminal according to claim 3, wherein, the threshold limit value is 3.3V.

* * * * *